US008146263B2

(12) United States Patent
Kipnes

(10) Patent No.: US 8,146,263 B2
(45) Date of Patent: Apr. 3, 2012

(54) ERGONOMIC VERNIER CALIPER BASE

(76) Inventor: Hyman Jack Kipnes, Hauppauge, NY (US)

( * ) Notice: Subject to any disclaimer, the term of this patent is extended or adjusted under 35 U.S.C. 154(b) by 0 days.

(21) Appl. No.: 12/806,245

(22) Filed: Aug. 6, 2010

(65) Prior Publication Data
US 2012/0030957 A1 Feb. 9, 2012

(51) Int. Cl.
G01B 5/02 (2006.01)
(52) U.S. Cl. .......................................................... 33/783
(58) Field of Classification Search .................... 33/783, 33/803, 831, 568, 573
See application file for complete search history.

(56) References Cited

U.S. PATENT DOCUMENTS

| 2,019,789 | A | | 11/1935 | Mahannah | |
| 2,106,525 | A | | 1/1938 | Henry | |
| 2,454,327 | A | | 11/1948 | Malsom | |
| 2,559,912 | A | * | 7/1951 | Ames | 33/803 |
| 2,669,958 | A | | 2/1954 | Sweeney | |
| 2,821,022 | A | | 1/1958 | Woodward | |
| 3,442,018 | A | | 5/1969 | Viollet | |
| 3,744,136 | A | | 7/1973 | Henke | |
| 4,058,302 | A | | 11/1977 | Barrowcliff | |
| 4,405,120 | A | | 9/1983 | Kober | |
| 4,535,542 | A | | 8/1985 | Liu et al. | |
| 4,611,404 | A | | 9/1986 | Arsenault | |
| 4,674,503 | A | | 6/1987 | Peyman et al. | |
| 4,848,759 | A | | 7/1989 | Gardner | |
| 4,879,802 | A | | 11/1989 | Winkler | |
| D347,160 | S | | 5/1994 | Hallgren | |
| 5,317,809 | A | | 6/1994 | Kipnes | |
| 6,009,633 | A | | 1/2000 | Novak | |
| 6,314,657 | B2 | * | 11/2001 | Kroll et al. | 33/783 |
| 6,594,915 | B2 | * | 7/2003 | Matsumiya et al. | 33/783 |
| D484,018 | S | | 12/2003 | Boyer et al. | |
| 7,533,474 | B2 | * | 5/2009 | Saito et al. | 33/811 |
| 2005/0235517 | A1 | * | 10/2005 | John et al. | 33/784 |
| 2009/0119940 | A1 | * | 5/2009 | Meichle et al. | 33/810 |
| 2009/0267618 | A1 | * | 10/2009 | Zhao | 33/784 |
| 2009/0320307 | A1 | * | 12/2009 | Richter | 33/810 |

FOREIGN PATENT DOCUMENTS

| CA | 2380561 A1 | 2/2003 |
| CN | 87102181 A | 10/1988 |
| CN | 200947022 Y | 9/2007 |
| CN | 101210793 A | 7/2008 |
| KR | 200182164 Y1 | 5/2000 |
| RU | 2242706 C1 | 12/2004 |

OTHER PUBLICATIONS

Grizzly Industrial Inc "Model H3022 Magnetic Base, Dial Indicator, Caliper Combo", catalog excerpt. 2005. pp. 1-12, published by Grizzly Industrial Inc, Bellingham, WA.

* cited by examiner

Primary Examiner — Brad Bennett
(74) Attorney, Agent, or Firm — Alfred M. Walker

(57) ABSTRACT

A bench top vernier caliper clamp includes a weighted base supporting a vertically extending section having a lower end integral with said base. An angle plate is removably secured to the vertically extending section adjacent a distal end of its vertically extending section, wherein the angle plate has a fixed lower jaw with a face. A loosening knob is provided for rotating the angle plate on the vertically extending section and for locking the angle plate with the lower jaw in any preselected rotated position. An upper jaw is provided having a face directly opposite the respective face on the lower jaw. A clamping knob moves the upper jaw toward and away from the lower jaw to clamp a portion of either end of the vernier caliper in place between the faces of the and lower jaws, whereby the vernier caliper remains fixed in place while measurements are being recorded.

20 Claims, 12 Drawing Sheets

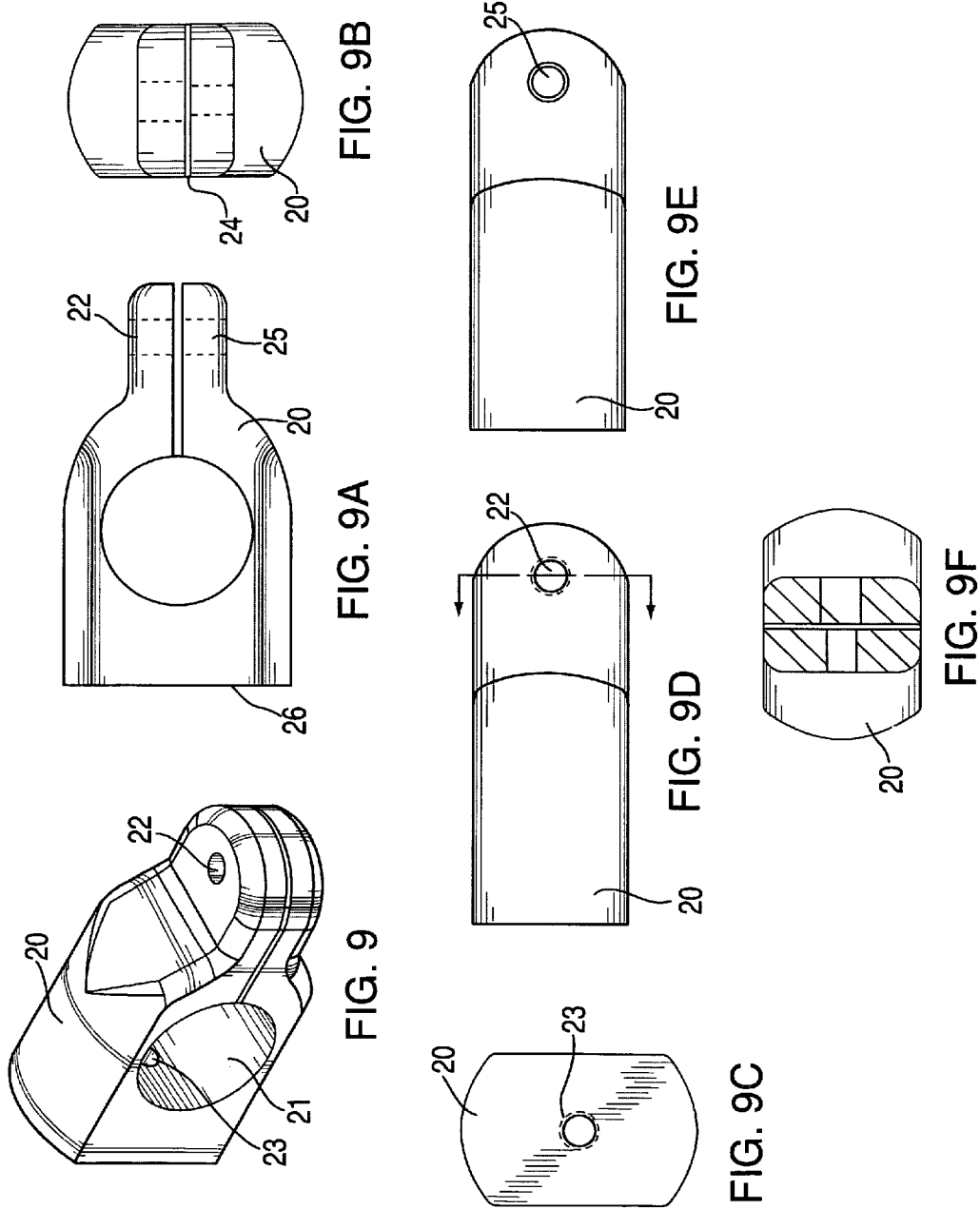

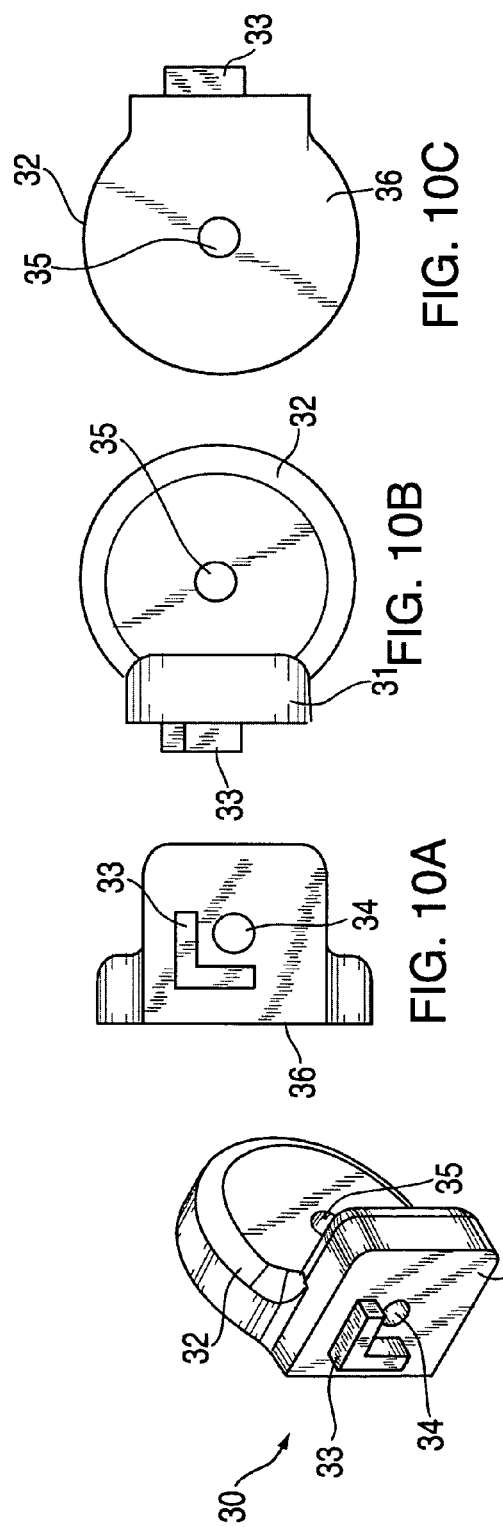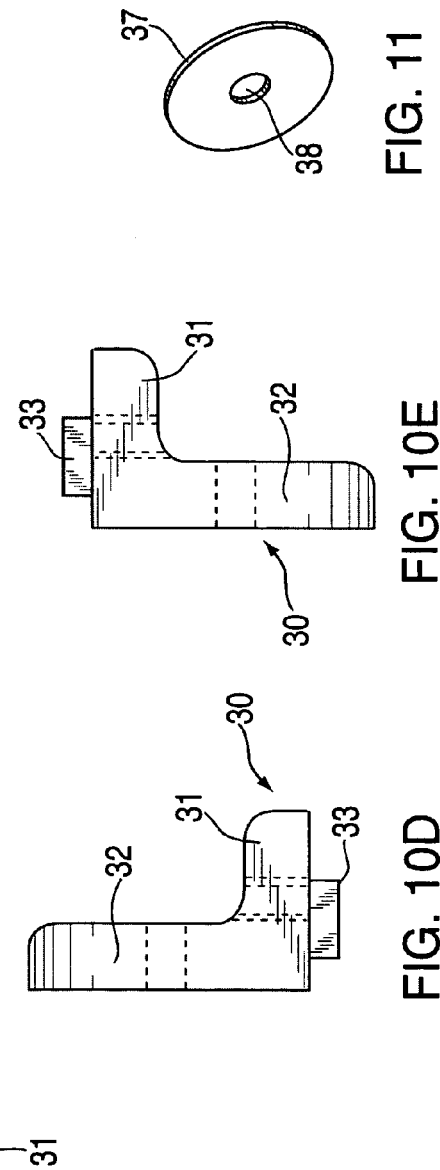

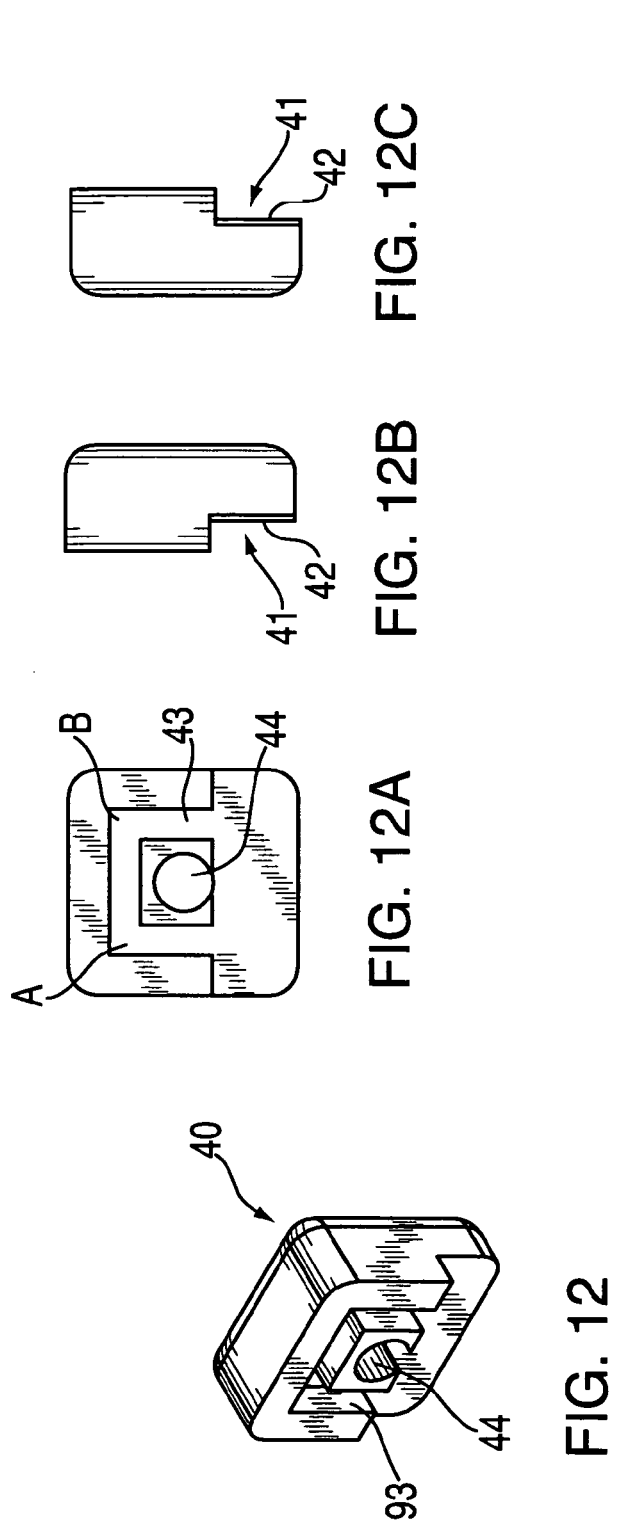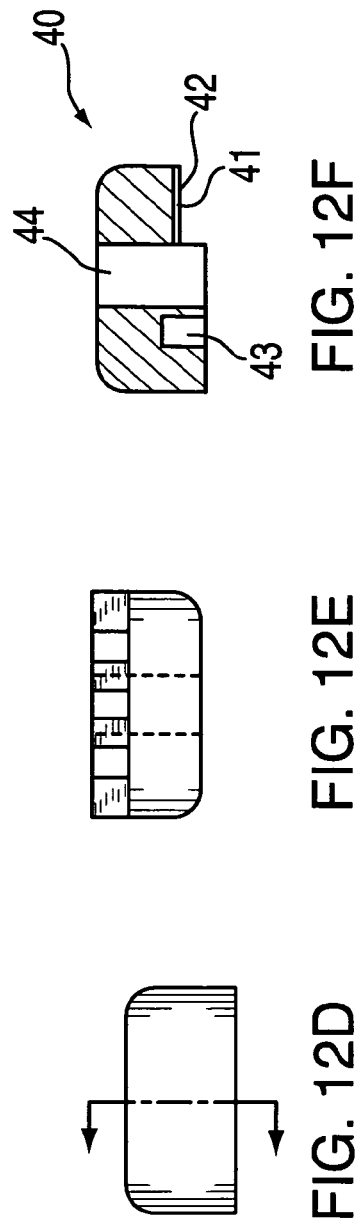

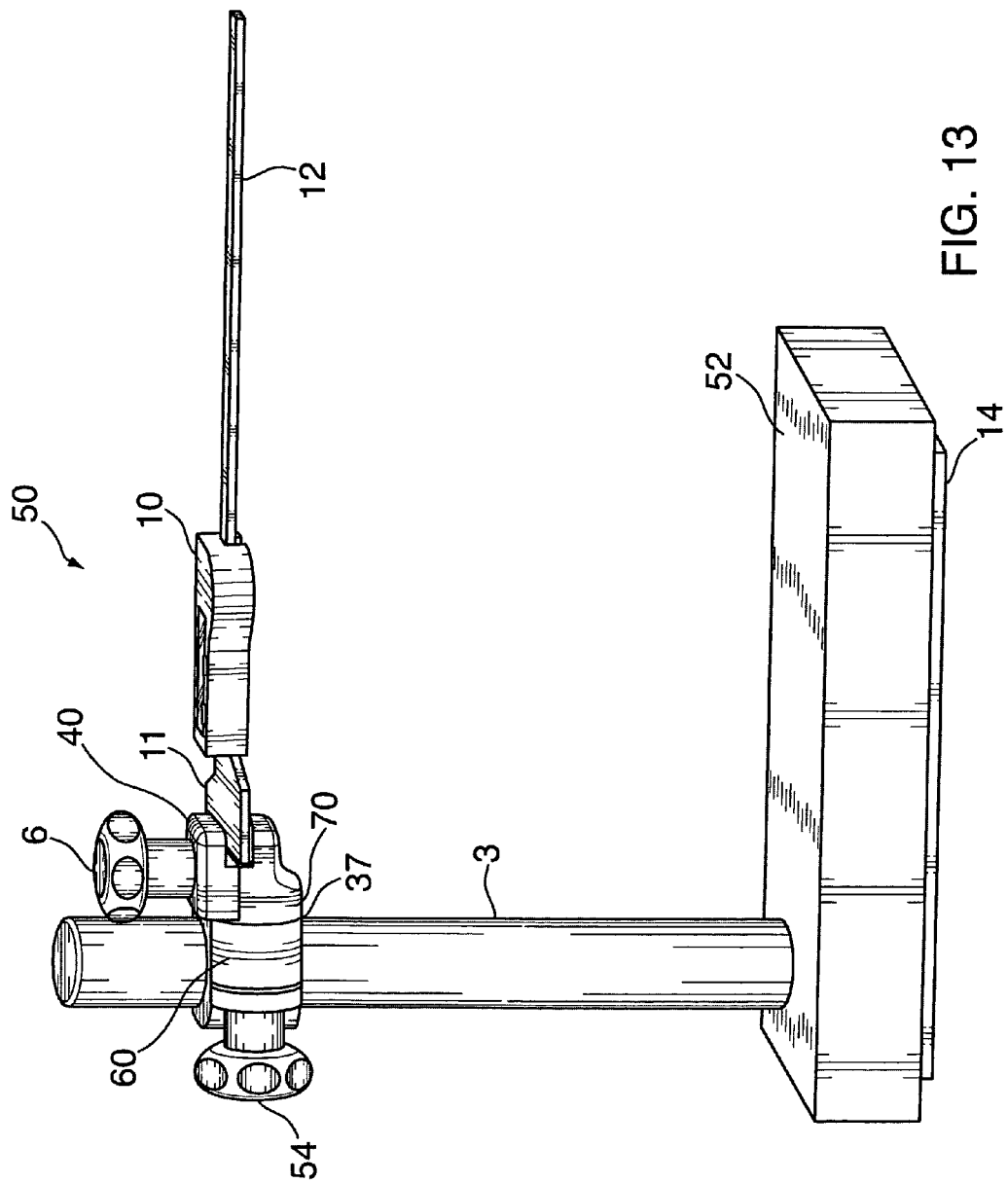

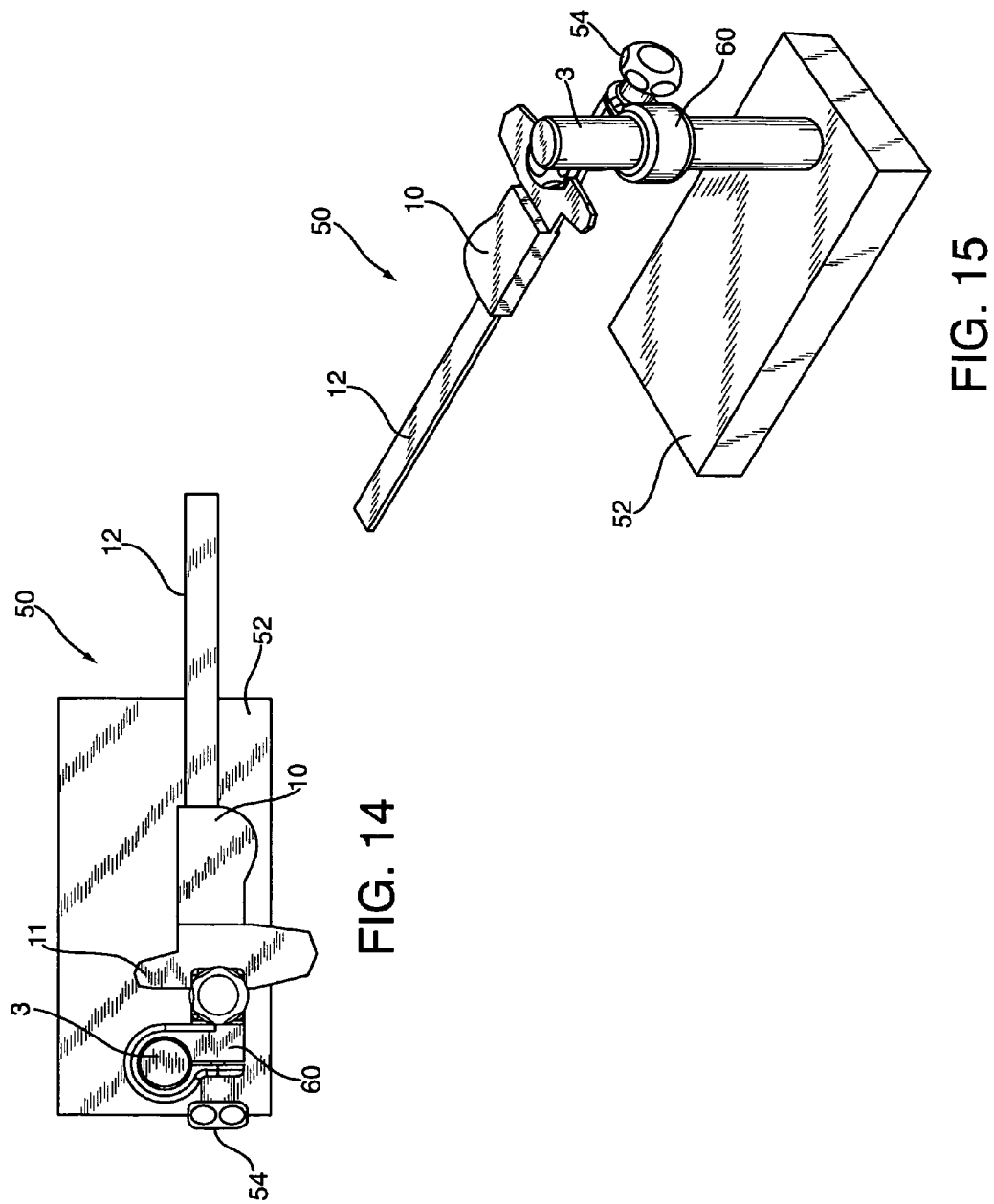

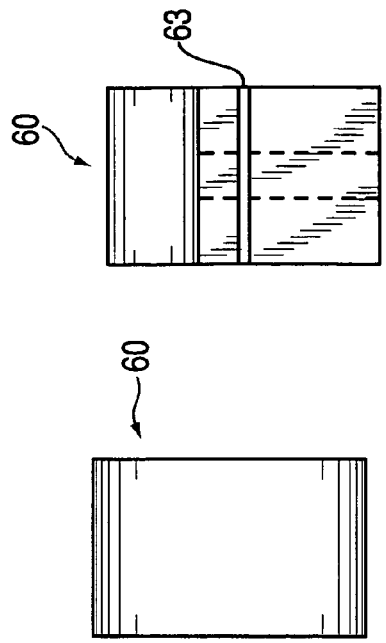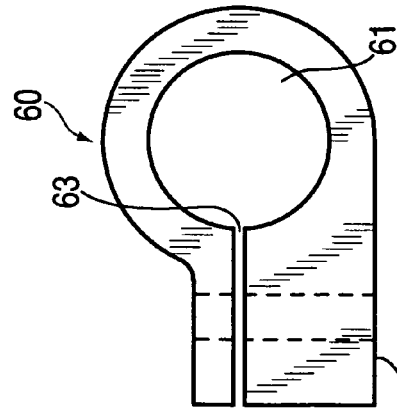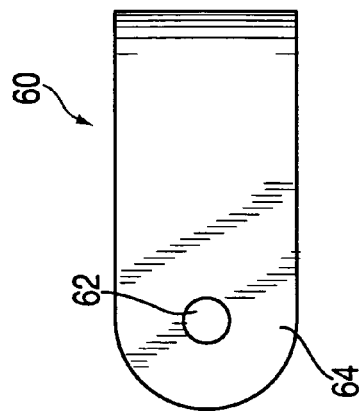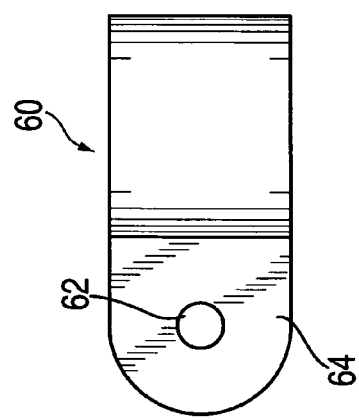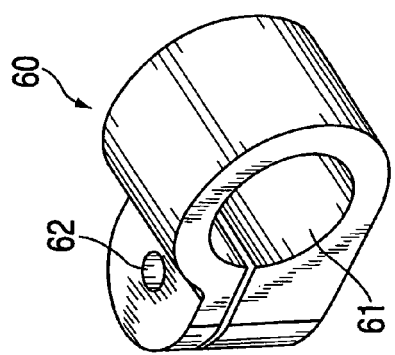

ERGONOMIC VERNIER CALIPER BASE

FIELD OF THE INVENTION

The present invention relates a holder for holding a vernier caliper used for taking measurements of a three dimensional object.

BACKGROUND OF THE INVENTION

Vernier calipers are instruments for making precise measurements of three dimensional objects. The jaws of the anvil head portion are moved into engagement with a selected portion of the three dimensional object being measured and the measurement viewed by the user. The user disengages the vernier caliper, puts it don away form the object being measured, and manually or digitally enters data relating to the measurement. Often multiple measurements are made of portions of three dimensional objects, so the user has to re-do the engagement process each time. However, often the user needs to make prolonged visual observation of the clamped device during data entry or note taking, which cannot be accomplished if the user has to disengage the jaws of the anvil portion of the vernier caliper for each measurement.

OBJECTS OF THE INVENTION

It is therefore an object of the present invention to provide a holder for a vernier caliper which enables the user to leave the caliper anvil jaw position in place while engaging a portion of a three dimensional object being measured, so that the user can conduct data entry or take manual handwritten notes, while the vernier caliper remains in fixed position at its most recent measurement.

It is also an object of the present invention to provide a vernier holder which can maintain the vernier caliper in a plurality of positions, while still being laid parallel to the horizontal surface above which the measurement is being taken.

Other objects which become apparent from the following description of the present invention.

SUMMARY OF THE INVENTION

An ergonomic vernier caliper base is provided by this invention for convenient use in making measurements on a bench top. The vernier caliper can be clamped to the base from the anvil head or from the tail section. The vernier jaws can be set horizontal, vertical, or at any oblique angle between to make measurements of an object which may be hand-held, resting on the weighted base plate, or resting on an optional holding block. The height of the vernier caliper can be adjusted relative to the base plate.

In all of the adjustments of height, vernier clamping site, and rotation of vernier jaws, the vernier body is precisely positioned parallel to the bench top. This latter feature distinguishes the vernier caliper base of this invention from ball joint bases with omnidirectional positioning of the clamped object. Omnidirectional positioning is not an advantage to ergonomic measuring using a vernier caliper, especially for quick set-up where individual setting of each degree of freedom saves time. The constraint of parallel vernier positioning relative to bench top also minimizes the chance of bumping the vernier caliper on the bench top possibly damaging it. Viewing angle can be conveniently set for different bench heights, standing vs. sitting position, and personal preferences by making full use of the three degrees of freedom afforded.

The ergonomic vernier caliper of this invention is comprised of a few parts assembled together using three knob screws (knobs) around a post rising vertically from a weighted base plate. One of the knobs controls clamping pressure of a post adapter against the post thereby affording convenient adjustment of height from the base plate. A second knob screw goes through a top clamp plate and engages threads in an angle plate below to clamp the vernier to the vernier caliper base. A third knob screw goes through a mounting hole in the angle plate and engages a threaded hole in the end of the post adapter thereby affording tilt adjustment of the vernier jaws. When the vernier jaws are set to be horizontal, all three knob screws are mutually orthogonal.

Although die cast metal or machined metal or rigid plastic parts may be used for the post adapter, the top clamp plate, and angle plate, in the preferred embodiment these parts would be injection molded of a plastic resin such as Nylon or Delrin. The post is preferably anodized aluminum or stainless steel. The weighted base plate is preferably granite, although other high density materials such as metal or filled resin may be used.

In an alternate embodiment, a modified post adapter and a modified angle plate are used to merge the functions of two screw knobs thereby creating a vernier caliper base with the same three degrees of freedom now controlled by only two knob screws. A single knob is used to adjust both the height of the vernier caliper on the post as well as the tilt of vernier jaws. A separate knob is still used to clamp or release the vernier caliper.

BRIEF DESCRIPTION OF THE DRAWINGS

The present invention can best be understood in connection with the accompanying drawings. It is noted that the invention is not limited to the precise embodiments shown in drawings, in which:

FIG. 9 is a perspective view of the post adapter.

FIG. 9A is a top view of the post adapter of FIG. 9.

FIG. 9B is a right end view of the post adapter.

FIG. 9C is a left end view of the post adapter.

FIG. 9D is a top view of the post adapter.

FIG. 9E is a bottom view of the post adapter.

FIG. 9F is a right end view in partial crossection of the post adapter.

FIG. 10 is a perspective view of angle plate.

FIG. 10A is a top view of the angle plate.

FIG. 10B is a right side view of the angle plate.

FIG. 10C is a left side view of the angle plate.

FIG. 10D is a back side view of the angle plate.

FIG. 10E is a front elevation of the angle plate.

FIG. 11 is a perspective view of an elastomeric gasket used between angle plate and post adapter.

FIG. 12 is a perspective view of the top clamp plate.

FIG. 12A is a bottom view of the top clamp plate.

FIG. 12B is a right side view of the top clamp plate.

FIG. 12C is a left side view of the top clamp plate.

FIG. 12D is a top side view of the top clamp plate.

FIG. 12E is a bottom side view of the top clamp plate.

FIG. 12F is a top side view in crossection.

FIG. 13 is a perspective view of an alternate embodiment of vernier caliper base of this invention.

FIG. 14 is a top view of the base of FIG. 13.

FIG. 15 is a back perspective view of the vernier caliper base of FIG. 13.

FIG. 16 is a perspective view of the post adapter of the alternate embodiment.

FIG. 16A is a top view of the post adapter of FIG. 16.

FIG. 16B is a right end view of the post adapter of FIG. 16.

FIG. 16C is a left end view of the post adapter of FIG. 16.

FIG. 16D is a top side view of the post adapter of FIG. 16.

FIG. 16E is a bottom side view of the post adapter of FIG. 16.

DETAILED DESCRIPTION OF THE DRAWINGS

Figure 1A:
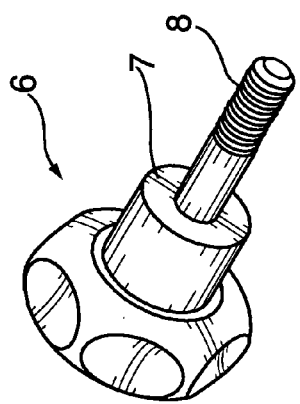
FIG. 1A is a perspective view showing the type of knob screw used in this invention.
Figure 1:
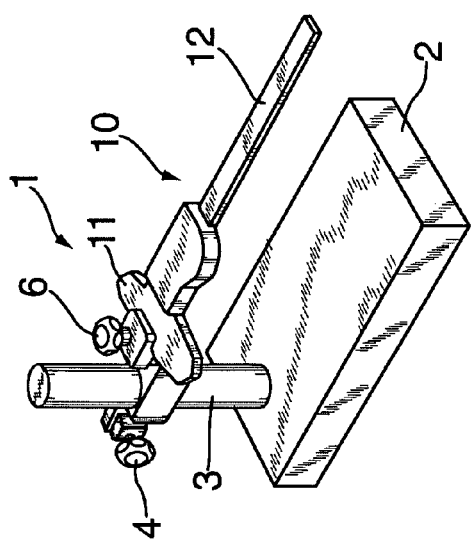
FIG. 1 is a perspective view of the vernier caliper base of this invention with the vernier clamped from the anvil head with jaws in a horizontal position.
Figure 2:
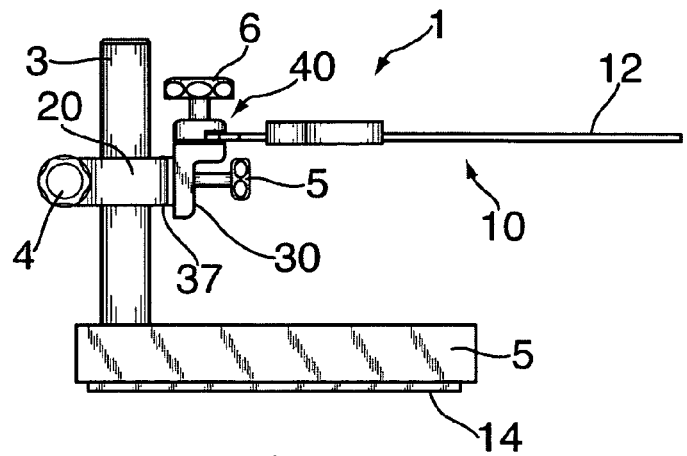
FIG. 2 is a front elevation of the vernier base of FIG. 1.
Figure 3:
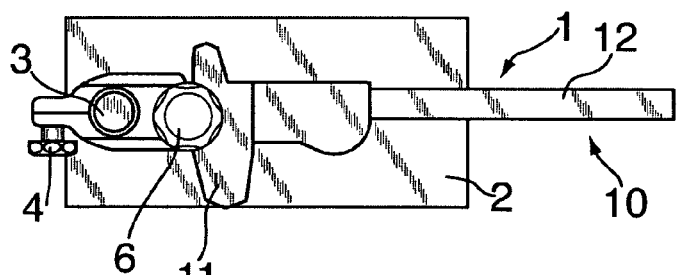
FIG. 3 is a top view of the vernier base of FIG. 1.
Figure 4:
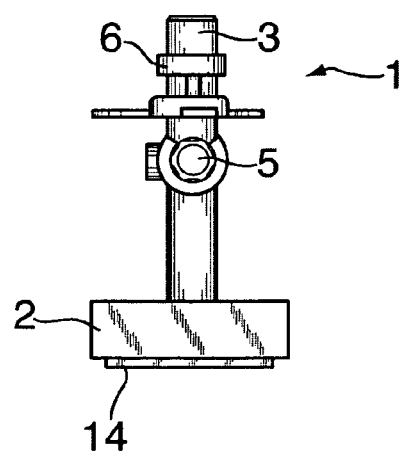
FIG. 4 is a right side elevation of the vernier base of FIG. 1.
Figure 5:
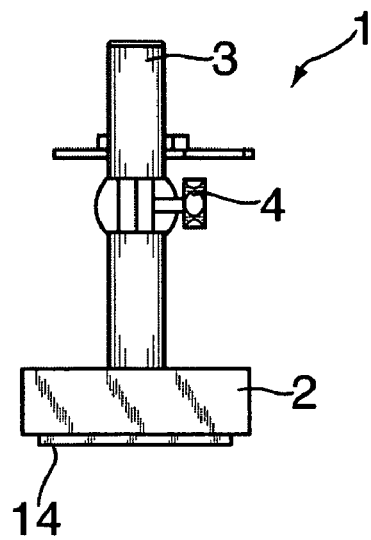
FIG. 5 is a left side elevation of the vernier base of FIG. 1.
Figure 6:
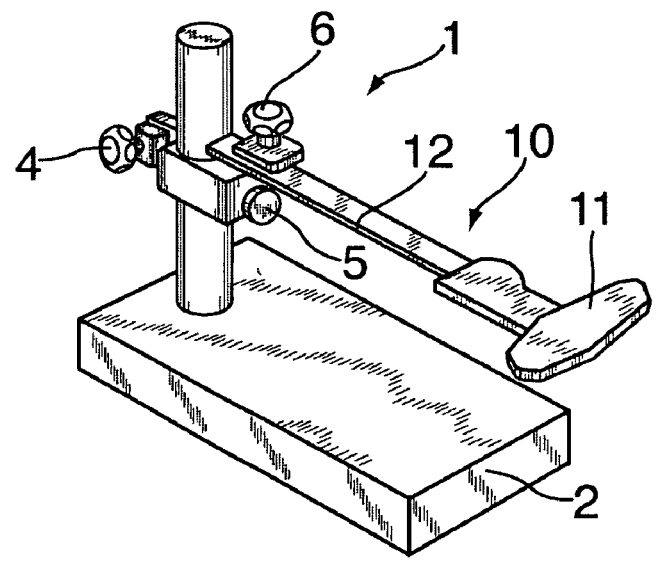
FIG. 6 is a perspective view of the vernier caliper base of this invention with the vernier clamped from the tail section.

A vernier caliper 10 with jaws in a horizontal position is shown clamped from the anvil head 11 in vernier caliper base 1 of this invention in FIGS. 1-5. FIGS. 2-5 are orthtographic projections of the perspective view of FIG. 1. FIG. 6 is a view of the same base 1 clamping vernier caliper 10 from the tail 12 section. FIG. 1A shows the type of knob screw 6 used in this invention; it has a shoulder 7 for applying clamping force and a threaded portion 8 at its distal end.

Figure 7:
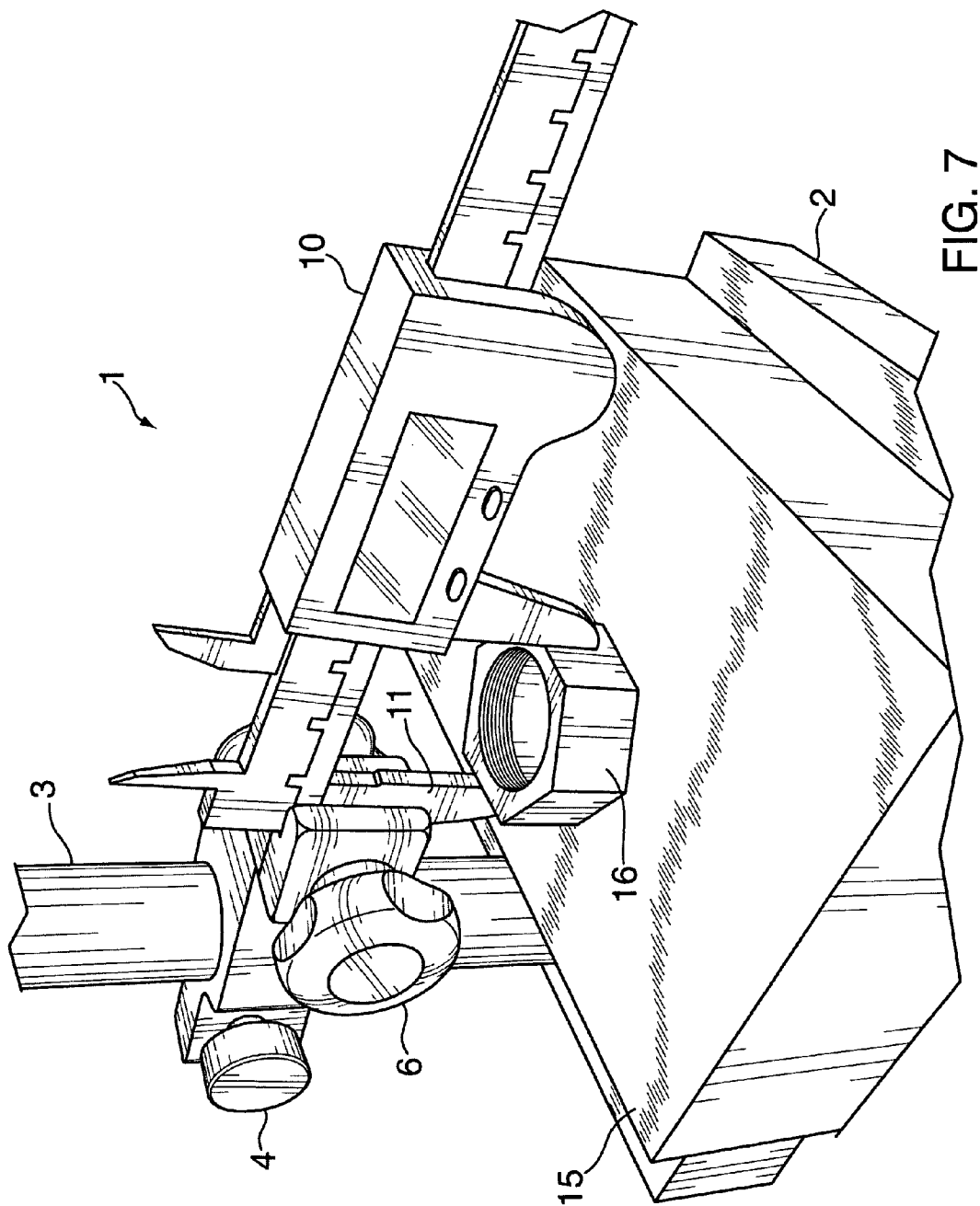
FIG. 7 is a perspective detail showing a vernier clamped in the base with the jaws in a vertical position.
Figure 8:
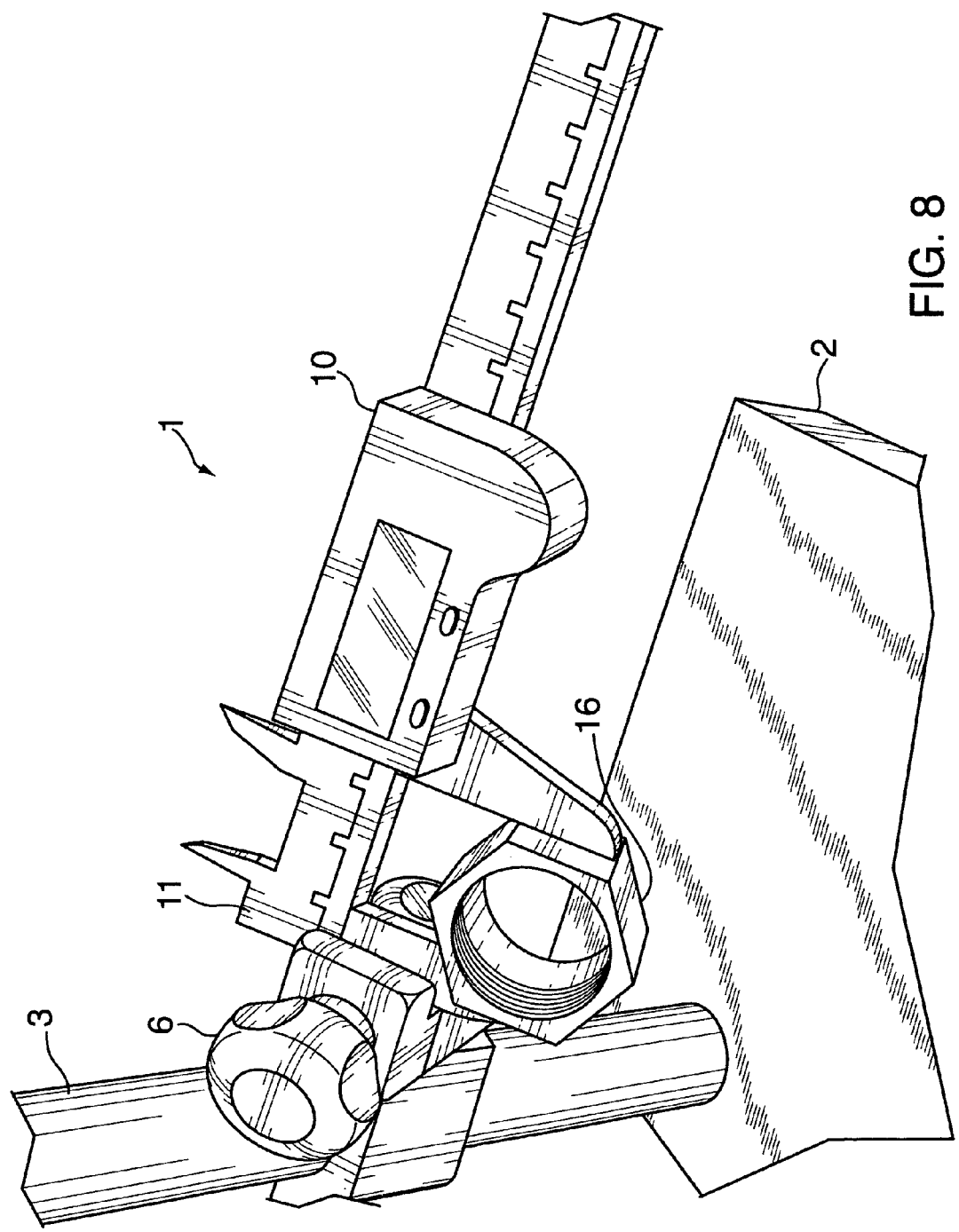
FIG. 8 is a perspective detail showing a vernier clamped in the base with the jaws rotated to an oblique position.

Post 3 is attached adjacent to one end of weighted base 2 which has a non-marring elastomeric pad 14 adhered to its bottom surface. Three knob screws similar to the one illustrated in FIG. 1A are used; they do differ in the lengths of the shaft and screw sections. Knob 4 is used to adjust the height of the vernier clamp comprised of top clamp plate 40 and angle clamp 30 above base 3. Knob 4 is engaged in threads in post adapter 20. Knob 6 which goes through top clamp plate 40 and engages threads in angle plate 30 applies clamping force to the caliper part engaged between these two members. Knob 5 which goes through a hole in angle plate 30 is engaged in threads in post adapter 20; it is used to set the desired attitude of the jaws vernier 10, allowing an unlimited degree of rotation. The detail of FIG. 7 shows the jaws rotated to a vertical position to measure object 16. Note that object 16 is resting on optional holding block 15, an example of which is shown in FIG. 7. In FIG. 8 the jaws have been set to an oblique angle.

FIGS. 9-9F show post adapter 20. Note that FIGS. 9A-9F are orthographic projections of FIG. 9. Large hole 21 provides access to post 3. Gap 24 enables hole 21 to be compressed tightly around post 3 to hold its position when knob 4 is tightened in threaded hole 22 which is in registration with through hole 25. Threaded hole 23 engages knob 5 which is used to adjust the orientation of vernier 10 jaws. Surface 26 is adjacent to angle plate 30.

FIGS. 10-10E show angle plate 30. FIGS. 10A-10E are orthographic projections of FIG. 10. This part forms the lower clamping surface that actually touches vernier caliper 10 at surface 31. Raised directional locator 33 engages a mating groove in top clamp plate 40 to form a front facing vernier clamp or a side facing clamp depending on the desired clamping element (anvil head 11 or tail 12). Threaded hole 34 engages knob 6 through top clamp plate 40. Part 32 with through hole 35 is used along with knob 5 to set the orientation of vernier 10 jaws. Surface 36 faces surface 26 in post adapter 20. Note that an elastomeric gasket or fender washer 37 with central hole 38 (see FIG. 11) is interposed between surfaces 36 and 26 to provide a high friction and cushioned engagement which is ergonomically superior.

FIGS. 12-12f show top clamp plate 40. FIGS. 12A-12F are orthographic projections of FIG. 12. Note that groove 43 around central through hole 44 engages raised directional locator 33 in angle plate 30. By loosening knob 6 a substantial amount to be able to clear the height of feature 33, top clamp plate 40 can be lifted and rotated in one of two directions to engage locator 33 when set down. This maintains a precise front direction if vertex A (FIG. 12A) is placed over the vertex of locator 33, or a precise side direction if vertex B is selected. Step 41 defines the clamping direction. Note that elastomeric (rubber) pad 42 is adhered to the top surface of step 41 to provide a high friction, non-marring, cushioned surface for engaging the top surface of vernier caliper 10.

FIG. 13 shows an alternate embodiment vernier caliper base 50 that maintains the same three degrees of freedom while maintaining a horizontal vernier caliper position as in the first embodiment; however, it does this with only two knob screws. FIGS. 14 and 15 show other views of base 50. The changes with respect to the first embodiment involve moving post 3 to a lateral offset position on new base 52, eliminating knob 5, using a modified post adapter 60, using modified angle plate 70, and using knob screw 54 to both adjust the height on post 3 as well as the rotation of the jaws of vernier caliper 10, to an unlimited degree.

FIGS. 16-16F show modified post adapter 60 used with the alternate embodiment. FIGS. 16A-16F are orthographic projections of FIG. 16. Large hole 61 accommodates post 3. Through hole 62 accepts knob screw 54. Gap 63 permits hole 61 to grasp post 3 to maintain a desired post height when knob 54 is tightened. Flat surface 64 is adjacent to modified angle plate 70.

Figure 17A:
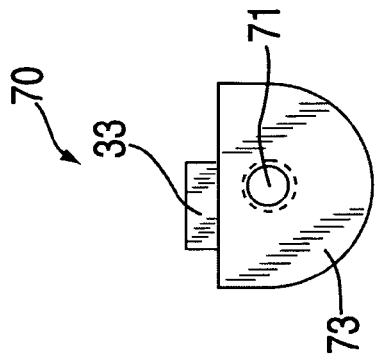
FIG. 17A is a front elevation of the angle bracket of FIG. 17.
Figure 17B:
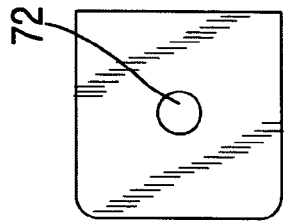
FIG. 17B is a right side view of the angle bracket of FIG. 17.
Figure 17C:
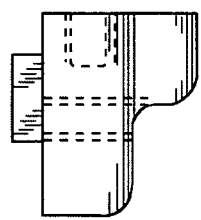
FIG. 17C is a left side view of the angle bracket of FIG. 17.
Figure 17D:
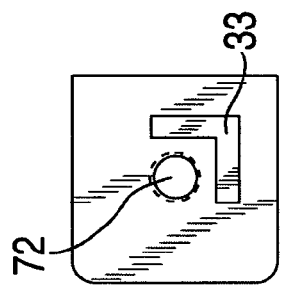
FIG. 17D is a top view of the angle bracket of FIG. 17.
Figure 17E:
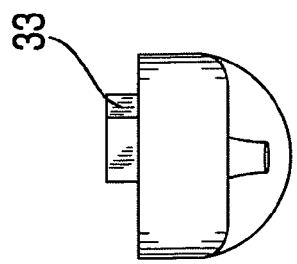
FIG. 17E is a bottom view of the angle bracket of FIG. 17.
Figure 17:
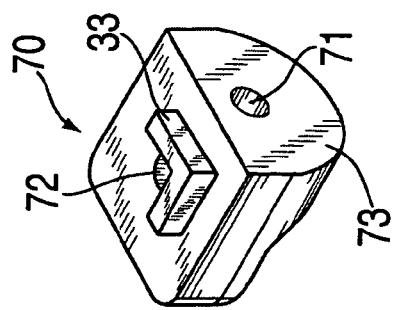
FIG. 17 is a perspective view of the angle bracket of the alternate embodiment.

FIGS. 17-17E show modified angle plate 70 used with the alternate embodiment. FIGS. 17A-17E are orthographic projections of FIG. 17. Note that raised directional locator feature 33 is dimensionally and functionally equivalent to that on angle plate 30 of the first embodiment. Angle plate 70 mates with an unmodified top clamp plate 40 and knob screw 6 to clamp vernier caliper 10. Threaded hole 72 engages knob 6. Blind threaded hole 71 engages knob 54 to control both desired height as well as orientation of angle plate 70 to set vernier 10 jaw angle. Flat surface 73 faces surface 64. Elastomeric fender washer 37 is interposed between surfaces 64 and 73. By using both hands, one on knob 54 and the other on angle plate 70, both height and angle adjustments can be set conveniently. It is also noted that partial loosening of knob 54 will allow post adapter 60 to move freely while angle plate 70 is still held secure. Further loosening of knob 54 will then free angle plate 70, allowing it to move for an unlimited degree of rotation while also permitting post adapter 60 to move freely.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A bench top vernier caliper clamp comprising:
a weighted base;
a vertically extending section having a lower end integral with said base;
an angle plate removably secured to said vertically extending section adjacent a distal end of said vertically extending section, said angle plate having a fixed lower jaw with a face;
a loosening knob having means for rotating said angle plate on said vertically extending section and locking said angle plate with said lower jaw in any preselected rotated position;
an upper jaw having a face directly opposite said face on said lower jaw; and
a clamping knob having means for moving said upper jaw to and away from said lower jaw for clamping a portion of said vernier caliper in place between the faces of said upper and lower jaws whereby said vernier caliper remains fixed in place while measurements are being recorded.

2. The clamp of claim 1 in which the face on said upper jaw has a central raised portion including an opening to receive a portion of said clamping knob means, said central raised portion being bounded on three sides by a spaced protruding ridge forming a groove between said central raised portion and said protruding ridge, a remaining portion of said upper jaw face having a flat distal region for contacting one side of said caliper.

3. The clamp of claim 2 in which the face on said lower jaw has a protruding ridge, said groove in said upper face adapted to receive said protruding ridge thereby assuring proper alignment of said jaws, the remaining portion of said upper jaw clamping said vernier caliper to said lower jaw.

4. The clamp of claim 3 in which the lower face and the remaining portion of said upper face are lined with cushioning material to protect said vernier caliper.

5. The method of using a vernier caliper to take successive measurements of a work piece comprising the steps of:
placing a portable clamp on a bench, said clamp comprising a weighted base, a vertically extending section having a lower end integral with said base, and an angle plate removably secured to said vertically extending section adjacent a distal end of said vertically extending section, said angle plate having a lower jaw with a face;
rotating a loosening knob member mounted on said vertically extending section to rotate said angle plate on said vertically extending section and locking said angle plate with said lower jaw;
rotating a clamping knob member on an upper jaw to position said upper jaw with respect to said lower jaw, said upper jaw having a face directly opposite said face on said lower jaw, said clamping knob member having a portion extending through said upper jaw to attach to said lower jaw, the face on said upper jaw having a central raised portion including an opening to receive said portion of said clamping knob means, said central raised portion being bounded on three sides by a spaced protruding ridge forming a groove between said central raised portion and said protruding ridge, a remaining portion of said upper jaw face having a flat distal region, said upper jaw being aligned with said lower jaw by a protruding ridge on the face on said lower jaw which extends into said groove in said upper face assuring proper alignment of said jaws;
rotating said clamping knob until said caliper is held firmly in place between said remaining portion of said upper face and said lower face;
positioning said clamp on said bench top and adjusting said loosening knob member to rotate said angle plate so that said vernier caliper is in position to take a measurement of a work piece on said bench top;
taking the measurement of the work piece using said vernier caliper;
recording the measurement while leaving said caliper in place; and
moving said caliper and base for taking a measurement in another location on said work piece or another work piece.

6. An ergonomic vernier caliper clamp and base for a vernier caliper having a pair of vernier object holding jaws holding an object being measured by the vernier caliper, wherein the vernier caliper can be clamped to the base from its respective anvil head or from its respective tail section, said clamp and base comprising:
a weighted base;
a vertically extending section having a lower end integral with said base;
an angle plate removably secured to said vertically extending section adjacent a distal end of said vertically extending section, said angle plate having a fixed lower jaw with a face;
a loosening knob having means for rotating said angle plate on said vertically extending section and locking said angle plate with said lower jaw in any preselected rotated position;
an upper jaw having a face directly opposite said face on said lower jaw;
a clamping knob having means for moving said upper jaw to and away from said lower jaw for clamping a portion of said vernier caliper in place between the faces of said upper and lower jaws whereby said vernier caliper remains fixed in place while measurements are being recorded;
said upper jaw and said lower jaw holding the vernier caliper in an axially extending horizontal position parallel to a bench top surface upon which measurements are made, wherein the vernier jaws of the vernier caliper rotate about the horizontal axis of the vernier caliper to be set at a horizontal, vertical, or any oblique angle therebetween to make measurements of the object being measured,
said angle plate, said upper jaw and said lower jaw being height adjustable about said vertically extending section for adjusting the height of the vernier caliper relative to the base plate;
wherein further in respective adjustments of height, vernier clamping site, and rotation of vernier jaws, the vernier body is positioned parallel to the bench top;
wherein further said horizontally parallel positioning of the vernier caliper relative to bench top minimizes the chance of bumping the vernier caliper on the bench top.

7. The ergonomic vernier caliper clamp and base as in claim 6 wherein said vertically extending section is a post rising vertically from said weighted base; said weighted base being a plate.

8. The ergonomic vernier caliper clamp and base as in claim 7 wherein a plurality of knobs and knob screws are positioned around said post rising vertically from said weighted base plate, wherein one set of said knobs and knob screws controls clamping pressure of a post adapter against the post, a second knob screw associated with a second knob goes through said upper jaw and engages threads in said lower jaw below to clamp the vernier caliper to the vernier caliper base and a third knob screw associated with a third knob goes through a mounting hole in said lower jaw and engages a threaded hole in an end of said post adapter thereby affording tilt adjustment of the vernier jaws of the vernier caliper being tiltable about said horizontally extending axis of said vernier caliper parallel to said bench top.

9. The ergonomic vernier caliper clamp and base as in claim 8 wherein when the vernier jaws are set to be horizontal, all three knob screws are mutually orthogonal.

10. The ergonomic caliper clamp and base as in claim 6 wherein said clamp is metal.

11. The ergonomic caliper clamp and base as in claim 6 wherein said clamp is plastic.

12. The ergonomic caliper clamp and base as in claim 6 wherein said base is stone.

13. The ergonomic caliper clamp and base as in claim 6 wherein said base is metal.

14. The ergonomic caliper clamp and base as in claim 6 wherein said base is filled resin.

15. The ergonomic caliper clamp and base as in claim 7 wherein said a single knob and screw set is used to adjust both the height of the vernier caliper about said vertically extending post and to tilt said vernier caliper about a horizontal axis parallel to the bench top upon which measurements are being made, and a second knob and screw set is provided to clamp or release the vernier caliper from said upper jaw and said lower jaw.

16. The clamp of claim 8 in which a respective lower face on said upper jaw has a central raised portion including an opening to receive a portion of said clamping knob means, said central raised portion being bounded on three sides by a spaced protruding ridge forming a groove between said central raised portion and said protruding ridge, a remaining portion of said upper jaw face having a flat distal region for contacting one side of said caliper.

17. The clamp of claim 8 in which a respective upper face on said lower jaw has a protruding ridge, said groove in said upper face adapted to receive said protruding ridge thereby assuring proper alignment of said jaws, the remaining portion of said upper jaw clamping said vernier caliper to said lower jaw.

18. The clamp of 17 wherein said upper jaw has a forward section facing in said longitudinally extending axis when said anvil of the vernier caliper is being held in place between said upper and said lower jaws.

19. The clamp of 17 wherein said upper jaw is rotated ninety degrees so that an axis of said forward section is perpendicular to said longitudinally extending axis when said tail of the vernier caliper is being held in place between said upper and said lower jaws.

20. The clamp of claim 19 in which the lower face and the remaining portion of said upper face are lined with cushioning material to protect said vernier caliper.

\* \* \* \* \*